United States Patent

[11] 3,625,638

[72] Inventors Claus Koster
Ditzingen;
Heinz Nothdurft, Stuttgart-Degerloch;
Harald Stamm, Gerlingen, all of Germany
[21] Appl. No. 10,918
[22] Filed Feb. 12, 1970
[45] Patented Dec. 7, 1971
[73] Assignee Robert Bosch GmbH
Stuttgart, Germany
[32] Priority Feb. 12, 1969
[33] Germany
[31] P 19 06 885.0

[54] TIMING AND OUTPUT CONTROL DEVICE FOR FUEL INJECTION PUMPS
7 Claims, 5 Drawing Figs.
[52] U.S. Cl................................................... 417/253,
137/513.3, 417/293, 417/311
[51] Int. Cl....................................................... F04b 49/00
[50] Field of Search........................................... 417/293,
253, 307, 311; 137/153.3, 153.5, 153.7; 138/46,
45; 251/321

[56] References Cited
UNITED STATES PATENTS
| 3,001,799 | 9/1961 | Plume | 137/513.3 |
| 3,363,574 | 1/1968 | Aldinger | 417/293 |
| 3,446,232 | 5/1969 | Erikson | 417/307 X |

Primary Examiner—Carlton R. Croyle
Assistant Examiner—Richard J. Sher
Attorney—Edwin E. Greigg ABSTRACT: In a fuel injection pump, the delivery of additional fuel quantities required for the starting operation is cut off and the timing of the injection is regulated by the r.p.m.-dependent pressure prevailing in the suction chamber of the fuel injection pump and generated by a feed pump driven by the engine. Said pressure is regulated by a control device disposed in a bypass or return conduit connecting said suction chamber with the suction side of said feed pump. For low r.p.m.'s, said control device maintains open a minimum flow passage section which is enlarged for higher r.p.m.'s. Thus, for a range of low r.p.m.'s, the pressure increase in the suction chamber in response to the r.p.m. increase is significant, while beyond said range, said response is only slight.

INVENTORS
Claus KOSTER, Heinz NOTHDURFT
and Harald STAMM 3,625,638

1

TIMING AND OUTPUT CONTROL DEVICE FOR FUEL INJECTION PUMPS

BACKGROUND OF THE INVENTION

This invention relates to a control device for fuel injection pumps associated particularly with internal combustion engines. The fuel injection pump is of the type that is provided with a feed pump having a parallel connected bypass valve which determines the output pressure of the feed pump. The output pressure, in turn, varies the injection timing (i.e. the start of fuel delivery during each pressure stroke) and the moment when delivery of additional fuel quantities required for the starting of the engine is cut off. The output pressure of said feed pump is regulated by a control shuttle which is disposed in a bypass channel interconnecting the input and the output side of the feed pump and which, by virtue of its displacement against the variable force of a regulator spring, varies the flow passage section of said bypass channel.

In a known fuel injection pump having such a control device and including a hydraulically operated injection timer (as disclosed, for example, in German Pat. No. 1,235,063), as well as a hydraulically operated mechanism for cutting off the additional fuel quantities required for starting (such as disclosed in German Pat. No. 1,225,914), the r.p.m.-dependent pressure at the output side of the feed pump is determined by the cross section of the control shuttle, by the configuration of the flow passage or throttle section opened to a greater or lesser extent by the control shuttle, and by the characteristics of the regulator spring. The response of the feed pump output pressure to the changes in r.p.m. is affected by the characteristics of the regulator spring. Thus, the flatter the slope of these spring characteristics, the weaker the response (pressure increase), and, conversely, the steeper their slope, the greater the response (i.e. the pressure increases significantly in response to increases in the r.p.m.).

In order to maintain narrow the r.p.m. range in which the additional fuel quantity for starting is cut off, in said r.p.m. range a significant pressure increase in response to the r.p.m. increases is desired. For the setting of the injection timing, however, which should be operational over the entire r.p.m. range, a high-pressure difference between starting r.p.m. and maximum r.p.m. conditions is hydraulically difficult to handle and is therefore undesirable.

OBJECT AND SUMMARY OF THE INVENTION

It is an object of the invention to provide an improved control device for fuel injection pumps of the above type wherein the increase of the feed pump output pressure in response to an r.p.m. increase is significant at the end of the starting r.p.m. range, that is, until the cutoff point of the additional fuel quantities required for starting and thereafter such response is substantially reduced.

Briefly stated, according to the invention the bypass channel interconnecting the inlet and the outlet of the feed pump has a selectable, continuously open minimum flow passage section which may be enlarged by the control shuttle only upon reaching a pressure which is higher than that required for cutting off the additional (starting) fuel quantities.

According to an embodiment of the invention, the selectable flow passage section of the bypass channel is adjustable from without the pump housing even during operation and the position of rest of the control shuttle is determined by a displaceable abutment.

In another embodiment of the invention, the continuously open flow passage section is constituted by a bore in the control shuttle. If a different minimum open section is desired, then the control shuttle is replaced by another having a bore of desired dimensions.

The invention will be better understood, as well as further objects and advantages will become more apparent, from the ensuing detailed specification of two exemplary embodiments taken in conjunction with the drawing.

2

DESCRIPTION OF THE FUEL INJECTION PUMP INCORPORATING THE CONTROL DEVICE ACCORDING TO THE INVENTION

Figure 1:
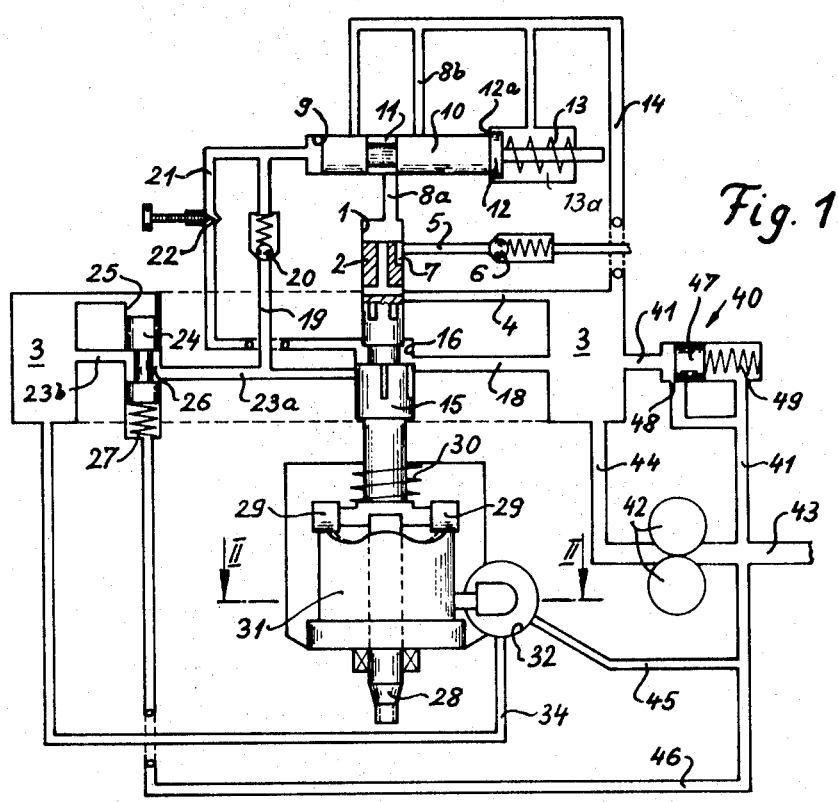
FIG. 1 is a schematic, simplified view of a fuel injection pump incorporating the invention.

Turning now to FIG. 1, in the cylinder 1 of the fuel injection pump there is disposed a piston 2 which is driven in such a manner that it executes both a reciprocating motion (fuel delivery function) and a rotary motion (fuel distributing function).

The cylinder 1 is supplied with fuel from a suction chamber 3 which is connected with the cylinder 1 by means of a supply channel 4. During the return stroke of piston 2 and while it dwells in its lower dead center, the pump work chamber forming part of cylinder 1 is supplied with fuel in the usual manner through ports provided in the piston 2.

A plurality of pressure channels 5 (only one shown) disposed radially about cylinder 1 and each provided with a pressure control valve 6 merges into cylinder 1. The piston 2, during its pressure strokes, delivers fuel from the cylinder 1 to the pressure channels 5 through one of the longitudinal distributor grooves 7 provided in the piston 2 and terminating at its frontal face.

For controlling the quantities of the delivered fuel, from the cylinder 1 there extends a bypass conduit formed of portions 8a and 8b which are separated by a cylinder 9 in which operates a regulator member 10 which establishes or interrupts communication between portions 8a and 8b by means of an annular circumferential groove 11 provided in the regulator member 10. When there is communication between channel portions 8a and 8b, no fuel delivery to the engine takes place although the pressure stroke of piston 2 is still in progress. The annular groove 11 is in continuous communication with the channel portion 8a and connects the latter with the channel portion 8b after the regulator member 10 has traveled a predetermined distance. The position of rest of the regulator member 10, in which the channel portions 8a and 8b are separated from one another and into which it is urged by spring 13, is determined by the engagement of a flange 12 (forming part of the regulator member 10) with an abutment face 12a. The bypass channel portion 8b, as well as the chamber 13a into which the regulator member 10 projects during operation and which accommodates spring 13, is connected with the suction chamber 3 by means of a channel 14.

The piston 2 continues in an enlarged portion which constitutes an auxiliary piston 15 operating in a cylinder 16. The components 15 and 16 form an auxiliary pump which is supplied with fuel from the suction chamber 3 through a channel 18. The auxiliary pump 15, 16 delivers fuel into the cylinder 9 through a channel 19 which includes a check valve 20. By virtue of said fuel delivery into cylinder 9, the regulator member 10 executes a forward stroke against the force of spring 13. During its backward stroke, the regulator member 10, driven by the spring 13, forces at least part of the fuel that caused its forward stroke back into the cylinder 16 of the auxiliary pump through a channel 21 which includes an adjustable throttle 22.

During the return stroke of the regulator member 10 which takes place between two pressure strokes of the pistons 2 and 15, the channel 19 is closed by the check valve 20 so that all the liquid displaced by the returning regulator member 10 is constrained to flow through the throttle 22. As a result, the regulator member 10 is braked in its return motion.

Beyond an r.p.m. determined by the flow passage section set by the throttle 22, the pressure stroke of the auxiliary piston 15 begins before the regulator member 10 is able to return to its initial position of rest. Due to the thus appearing so-called fluid abutment, the regulator member 10 begins its forward stroke from a more advanced position; as a result, the channel portions 8a and 8b are interconnected at an earlier moment during the pressure stroke. Consequently, a decrease of the injected fuel quantities occurs and, as a result, the r.p.m. of the engine associated with the fuel injection pump also decreases.

The fuel quantity supplied during each individual pressure stroke of piston 15 is selected in such a manner that during normal operation, the regulator member 10, even if it has moved from its initial position of rest, opens the bypass channel portions 8a and 8b prior to the termination of each pressure stroke. Accordingly, at the end of each individual pressure stroke of the piston 15, one part of the fuel present in the pump work chamber of the fuel injection pump 1, 2 flows through the bypass channel 8a, 8b back into the suction chamber 3.

At least one part of the fuel which was thus forced to return into the suction chamber 3, is, during the starting of the engine, also forced through the pressure channels 5, resulting in an additional fuel quantity (starting quantity) delivered to the engine. This additional fuel quantity, however, has to be cut off as soon as the engine r.p.m. has reached a desired value which advantageously lies under the idling r.p.m. of the engine.

In order to effect such an additional fuel quantity delivery during the starting period of the engine, from the channel 19 of the auxiliary pump 15, 16 there extends a relief conduit 23a, 23b merging into the suction chamber 3. Through said relief conduit a sufficient portion of the fuel delivered by the auxiliary pump 15, 16 for the displacement of the control member 10 is rendered ineffective, to ensure that the regulator member 10 either remains in its initial position of rest or is allowed to execute only a small forward stroke insufficient to open the bypass channel 8a, 8b.

The relief conduit portion 23a is separated from the relief conduit portion 23b by a cylinder 25 in which there is reciprocably disposed a shutoff slider 24. The latter closes the relief conduit 23a, 23b as soon as the engine has reached the above-named positively determined r.p.m. The shutoff slider 24 is provided with a circumferential annular groove 26 which, when the slider 24 is in its position of rest as shown in FIG. 1, establishes communication between the conduit portions 23a and 23b. The shutoff slider 24 is exposed on one frontal face by the r.p.m.-dependent pressure of the fuel that fills the suction chamber 3. As soon as the engine has reached the aforenoted positively determined r.p.m., the shutoff slider 24 is displaced against the force of a return spring 27 and thus interrupts communication between portions 23a and 23b of the relief conduit. The cross section of the shutoff slider 24 and the force of the return spring 27 are thus parameters for the termination of additional fuel delivery effected by the fuel pressure in suction chamber 3.

The pressure prevailing in the suction chamber 3 also serves for setting the timing of the fuel injection. The pump piston 2, 15 is rotated by a shaft 28 driven by the engine.

The said rotation as well as an axial reciprocating motion is imparted to the piston 2, 15 by means of a device now to be described. The reciprocating motion of piston 2, 15 is effected by means of rollers 29 which are connected with the piston and which, under the effect of a spring 30, are urged into engagement with the face of a cam 31 which, although stationary in principle, may execute small angular motions about the common axis of the shaft 28 and the pistons 2, 15 to effect an adjustment of the injection timing.

Figure 2:
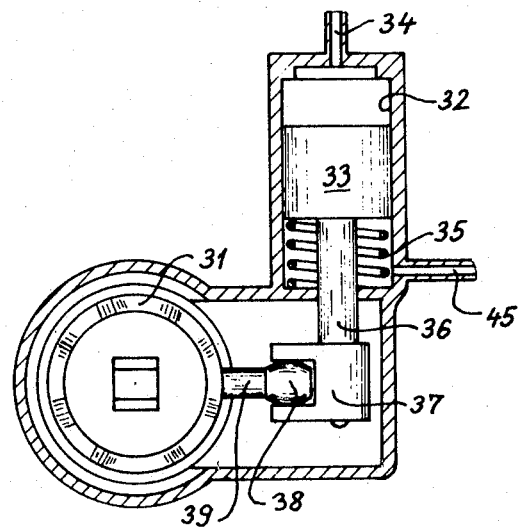
FIG. 2 is a sectional view along line II—II of FIG. 1.

Turning now to FIG. 2, the said small angular motions of the cam 31 are obtained by a mechanism that comprises a cylinder 32 and a piston 33 operating therein. The latter is adapted to be displaced in the one direction by the pressure of fuel admitted through a conduit 34 from the suction chamber 3. The piston 33 is displaced in the other direction by means of a spring 35. The linear movements of the piston 33 cause small angular displacements of the cam 31 by transmitting forces thereto through piston rod 36, its fork 37 and a stub 39 affixed to and projecting radially from cam 31. The stub 39 terminates in a spherical head 38 received in fork 37. When the pressure in the suction chamber 3 increases, the motion of the piston 33 causes a rotation of the cam 31 with respect to the shaft 28 in the sense of an earlier start of the fuel injection.

Turning once again to FIG. 1, the pressure which is prevailing in suction chamber 3 and which is utilized for terminating the delivery of additional fuel quantities and for timing the injection is regulated by a control device generally indicated at 40 disposed in a bypass channel 41 which connects the suction chamber 3 with the inlet of the feed pump (volumetric pump) 42. The latter is driven with an r.p.m. identical to the r.p.m. of the fuel injection pump. Stated in other terms, it is driven with an r.p.m. proportionate to the engine r.p.m. and thus, delivers increased quantities of liquid fuel as the r.p.m. increases. The feed pump 42 draws the fuel from a tank (not shown) through a conduit 43 and delivers it to the suction chamber 3 through a supply conduit 44. The suction conduit 43 is in communication with bypass channel 41, and, through discharge conduits 45 and 46, with the respective chambers accommodating the return spring 27 of the shutoff slider 24 and the spring 35 of the piston 33.

The control device 40 is connected parallel with the feed pump 42. The pressure prevailing in the suction chamber 3 of the fuel injection pump is determined by returning one part of the fuel quantity supplied by the feed pump 42 into the suction side thereof. The quantity of the returning fuel, in turn, is determined by means of a control shuttle 47 that regulates the flow passage section of a bore 48. The control shuttle 47 is displaced against the force of a regulator spring 49 to a greater or lesser extent by the pressure prevailing in the suction chamber 3 and affecting one frontal face of the control shuttle; as a result, the flow passage section of bore 48 will be varied.

It is seen that the increase of the pressure in the suction chamber 3 in response to an increase of the r.p.m. is also a function of the area of the control shuttle 47 exposed to the fuel pressure and the characteristics of the regulator spring 49. If the control spring 49 has steep characteristics, the pressure will vary sharply with an r.p.m. variation. Conversely, if the said characteristics are flat, then such pressure change in response to the r.p.m. change will be only slight.

DESCRIPTION OF TWO EMBODIMENTS OF THE CONTROL DEVICE 40

In the embodiments 40a (FIG. 3) and 40b (FIG. 4), the control shuttle 47a, 47b, respectively, and the regulator spring 49 are disposed in a sleeve 50 threadedly received in pump housing 52. A plug 51, which is force fitted into the sleeve 50, serves as a seat for the regulator spring 49. In order to change the preload of the latter, the plug 51 is, for example by means of hammer blows on an appropriate tool, displaced inwardly. By virtue of the substantial friction between the plug 51 and the sleeve 50, the former remains in its new position without being displaced by the control shuttle 47a, 47b or by the force of the regulator spring 49. The sleeve 50 is threaded into the pump housing 52. The position of rest of the control shuttle 47a is determined by an abutment loaded by a spring 53 which engages with its end remote from the abutment 54, a respective plug 55a, 55b threadedly held within the housing 52. O-rings 56 provide hermetic seals between the sleeve 50, the plug 55a, 55b and the abutment 54 on the one hand and the pump housing 52 on the other hand. The inside of sleeve 50 which accommodates the regulator spring 49 is, by means of a bore 57, maintained at the same pressure level as the outlet portion of the bypass channel 41.

Figure 3:
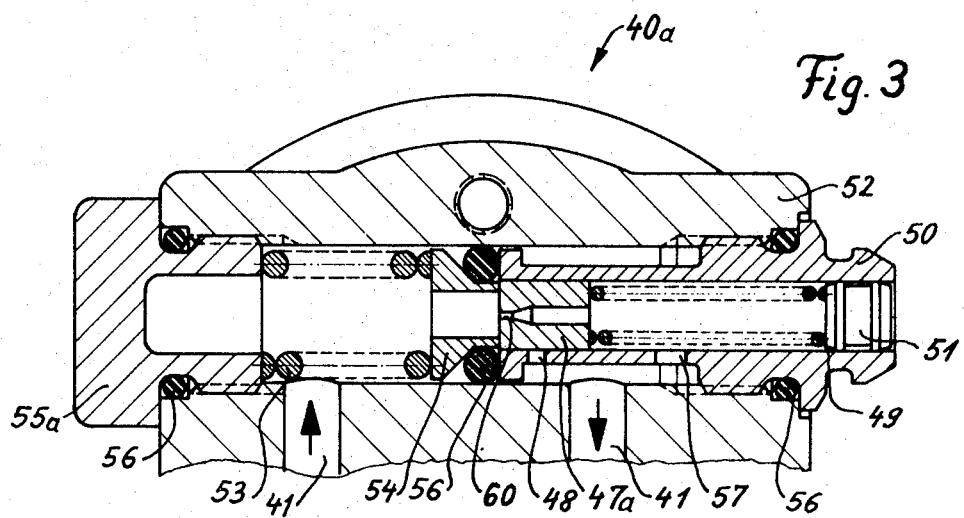
FIG. 3 is a sectional view of a first embodiment of the invention.

According to the first embodiment 40a of the control device depicted in FIG. 3, the control shuttle 47a is provided with an axial throttle bore 60. The fuel entering the control device in the direction of the arrow through the bypass channel 41 from the suction chamber 3 flows during low r.p.m.'s solely through the throttle bore 60 into the chamber accommodating the regulator spring 49 and proceeds without throttling through bore 57 to the outlet side of the bypass channel 41 and then to the inlet or suction side of the feed pump. As soon as the fuel has reached a certain pressure immediately upstream of the throttle bore 60, the control shuttle 47a is displaced against the force of the regulator spring 49 to open the bore 48 after traveling a predetermined distance.

Figure 4:
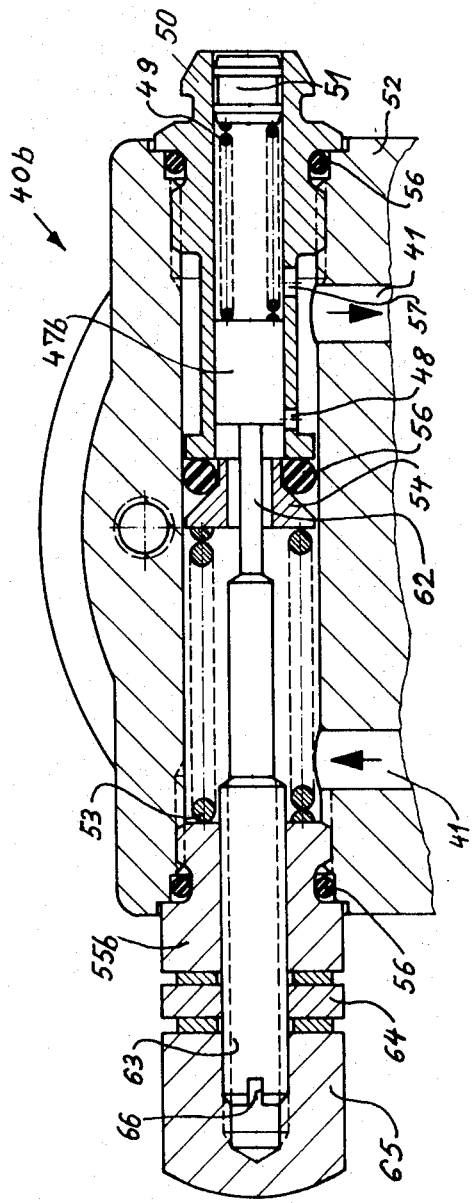
FIG. 4 is a sectional view of a second embodiment of the invention.

According to the second embodiment 40b of the control device depicted in FIG. 4, the control shuttle 47b has no throttle bore. Instead, the control shuttle 47b is maintained by means of an abutment rod 62 in a position of rest in which the bore 48 has a predetermined minimum free flow passage section. The abutment rod 62 is integral with a screw 63 rotatably held in an axial bore of the plug 55b. The screw 63 is secured by means of a counter nut 64 and is covered by a cap nut 65 for protection against accidental contact. The screw 63 is provided on its end remote from the abutment 62 with a diametrical slot 66 which, subsequent to the removal of the cap nut 65, may be engaged by a screwdriver for the adjustment of the position of rest of the control shuttle 47b.

As the fuel flows through the control device in the direction of the arrow, the control shuttle 47b will move away from its abutment 62 only when the throttle effect of the minimum free flow passage section of the bore 48 has generated a sufficiently large pressure immediately upstream of the control shuttle 47b.

It is known that a throttle bore of constant cross section causes a quadratic increase of the pressure as the fuel quantity forced through said bore increases. The fuel quantity, which in the above-described control device is forced through the constant throttle of the minimum cross section, is, as indicated hereinabove, proportionate to the r.p.m. of the feed pump.

Figure 5:
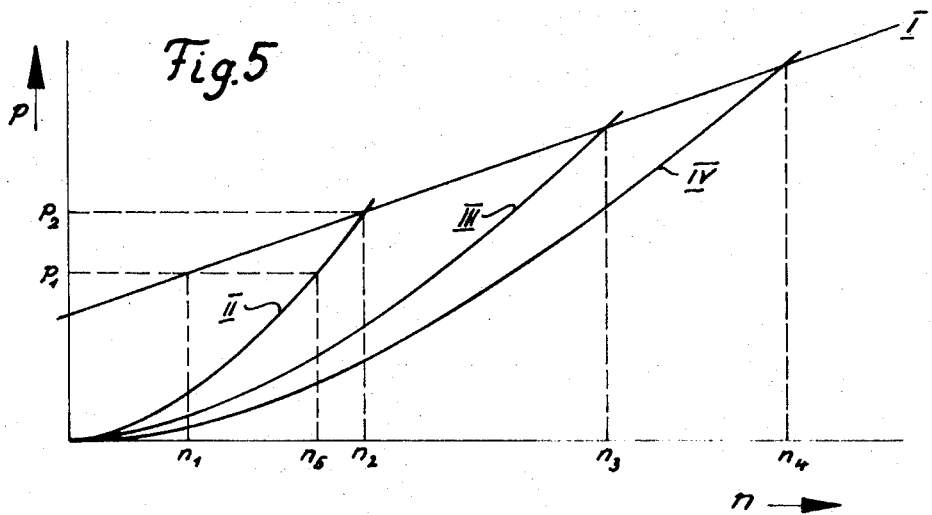
FIG. 5 is a pressure vs. r.p.m. diagram showing curves obtained by virtue of the control device according to the invention.

Turning now to FIG. 5, in the diagram shown therein, the ordinate represents pressure values, while the abscissa indicates the r.p.m. The control curves II, III, and IV correspond to throttles of different minimum constant cross section. The curves start out flat, but, due to the aforenoted quadratic characteristics, very soon become steep. The ideally linearly proceeding curve I corresponds to a control of the fuel pressure beyond the r.p.m. in which the control shuttle 47 is displaced against the force of the regulator spring 49. As it may be observed from the diagram, at low r.p.m.'s (up to the r.p.m. values $n_2$, $n_3$, $n_4$) the pressure in the suction chamber 3 of the fuel injection pump will increase in accordance with one of the curves II, III or IV, depending upon the cross section of the continuously open throttle and, thereafter, as soon as the control shuttle 47 begins to open (i.e. begins to enlarge the cross section of the bore 48), the pressure in suction chamber 3 will vary according to curve I. The curves II, III, and IV are, before they intersect the curve I, steeper than the latter. If no minimum continuous flow passage section were available, in order to obtain a pressure increase from $p_1$ to $p_2$ in the suction chamber 3, the r.p.m. would have to increase from $n_1$ to $n_2$. By virtue of the minimum cross section, the pressure increase from $p_1$ to $p_2$ occurs in the narrow r.p.m. range of from $n_5$ to $n_2$. Thus, in a narrow r.p.m. range a substantial pressure increase is obtained which is used to shut off the additional fuel quantities (starting quantities) in said range. It is to be noted that the hysteresis of the shut-off slider 24 requires a steep pressure course since the slider has to be displaced and thereby the additional starting fuel quantities have to be shut off within a predetermined r.p.m. range.

Dependent upon the desired cutoff r.p.m., the aforediscussed minimum cross section is varied. After shutting off the starting quantities according to the selected throttle cross section at $n_2$, $n_3$ or $n_4$, the control shuttle 47 is displaced, and thereupon the pressure increases in response to the r.p.m. according to the curve I. It follows that even in case of a maximum r.p.m., the pressure in the suction chamber 3 and thereby the force affecting the timing piston 33 may be controlled by the spring 35.

The control device according to the invention has the advantage that the slope of the curve representing the pressure change in the suction chamber 3 in response to the r.p.m. is large in the range of cutting off the starting fuel quantities (i.e. towards the end of the starting r.p.m. range) and thereafter, for the timing of the injection for the entire r.p.m. range the slope of said curve is substantially uniform and relatively small.

That which is claimed is:

1. In a control device for a fuel injection pump associated with an internal combustion engine, said fuel injection pump is of the known type that includes (A) a feed pump having an output side and an input side, the pressure in said output side determining the timing of the injection and the cutoff of additional fuel quantity delivery required for starting and (B) a bypass channel connecting said output side with said input side, the improvement comprising,
   A. a control shuttle positioned in said bypass channel and displaceable by said pressure, said control shuttle, by virtue of its displacement, varying the flow passage section of said bypass channel in response to pressure values greater than the pressure determining said cutoff,
   B. an abutment determining the position of rest of said control shuttle,
   C. a regulator spring urging said control shuttle into said position of rest against the force of said pressure, and
   D. Means defining a constant minimum open flow passage section in said bypass channel when said control shuttle is substantially in its position of rest in response to pressures smaller than the last-named pressure values.

2. An improvement as defined in claim 1, wherein the preload of said regulator spring is adjustable.

3. An improvement as defined in claim 1, wherein said minimum flow passage section is enlarged only upon reaching a pressure higher than that required for cutting off said additional fuel quantity.

4. An improvement as defined in claim 1, including a bore uncovered by said control shuttle to an increasing extent during its displacement by said pressure against the force of said regulator spring.

5. An improvement as defined in claim 1, wherein said means defining a minimum open flow passage section is formed of a throughgoing bore provided in said control shuttle.

6. An improvement as defined in claim 1, wherein said means defining a minimum open flow passage section is formed of a bore covered partially by said control shuttle when the latter is in said position of rest.

7. An improvement as defined in claim 6, wherein said abutment is adjustable in the direction of displacement of said control shuttle to vary the position of rest thereof for changing said minimum flow passage section.

* * * * *